United States Patent [19]

Blazek et al.

[11] Patent Number: 4,904,088
[45] Date of Patent: Feb. 27, 1990

[54] METHOD AND APPARATUS FOR DETERMINING RADIATION WAVELENGTHS AND WAVELENGTH-CORRECTED RADIATION POWER OF MONOCHROMATIC LIGHT SOURCES

[75] Inventors: Vladimir Blazek; Jürgen Seidenberg, both of Aachen, Fed. Rep. of Germany

[73] Assignee: U.S. Philips Corporation, New York, N.Y.

[21] Appl. No.: 244,577

[22] Filed: Sep. 13, 1988

Related U.S. Application Data

[63] Continuation of Ser. No. 762,181, Aug. 2, 1985, abandoned.

[30] Foreign Application Priority Data

Aug. 10, 1984 [DE] Fed. Rep. of Germany ....... 3429541

[51] Int. Cl.$^4$ ............................................. G01J 3/50
[52] U.S. Cl. .................................. 356/402; 250/226; 356/243
[58] Field of Search ................. 356/402, 243; 250/226

[56] References Cited

U.S. PATENT DOCUMENTS

4,057,146 11/1977 Castaneda et al. ............. 250/226 X
4,308,456 12/1981 Van Der Gaag et al. ..... 356/402 X
4,309,604 1/1982 Yoshikawa et al. ................ 250/226

Primary Examiner—Vincent P. McGraw
Attorney, Agent, or Firm—Paul R. Miller

[57] ABSTRACT

A rapid and simple opto-electronic measuring method of determining the wavelength and the wavelength-corrected power of monochromatic light sources is indicated. The photodetectors (1, 2) of different spectral overall sensitivity are acted upon through a transfer device by the flow of radiation of the light source to be measured, and the signals (I1, I2) then produced are supplied through a unit (3) for acquisitioning and processing the measurement values to a calculation unit (4). From the signals (I1, I2) a wavelength-specific quantity is derived in the calculation unit which is compared with the wavelength-specific data present in memory unit (6) after one calibration. Thus, the actual wavelength of the light source to be measured can be determined, be indicated by an indicator unit (7), or be supplied through a data interface. When the actual wavelength is known, a wavelengh-specific correction factor can be interrogated in the memory unit, and a wavelength-corrected power can be calculated in the calculation unit. FOr actuation of the photodetectors (1, 2), a radiation splitter, light wave guides with corresponding connection members of Ulbricht balls can be used.

20 Claims, 5 Drawing Sheets

METHOD AND APPARATUS FOR DETERMINING RADIATION WAVELENGTHS AND WAVELENGTH-CORRECTED RADIATION POWER OF MONOCHROMATIC LIGHT SOURCES

This is a continuation of application Ser. No. 762,181, filed Aug. 2, 1985, now abandoned.

The invention relates to a method of determining the radiation wavelength of substantially monochromatic optical radiation by means of a measuring arrangement having an input for the optical radiation in which the optical radiation is transmitted to two photodetectors having different spectral sensitivity variations. The photodetectors provide electrical output signals supplied to an electronic unit for acquisitioning and processing the measurement values, and the output signals are supplied depending upon the radiation wavelength to an indicator device calibrated in a manner such that the radiation wavelength is directly indicated. The invention is also directed to an arrangement for carrying out the method. The wavelength of monochromatic light sources, such as variable laser systems, light-emitting diodes (LED's) and semiconductor laser diodes (LD's), is determined in general by means of monochromators or filter sets. These measuring arrangements are very complicated and can be manipulated only with difficulty. They are not suitable to be incorporated into transportable measuring apparatus of small dimensions.

A method of the kind mentioned in the opening paragraph is known from German Offenlegungsschuft 30 30 210. In this case, the output signals of the photoconductors are supplied to a divider circuit, which supplies an output voltage proportional to the quotient of these signals and is indicated in analogue form by an indicator instrument. The spectral sensitivities of the photodetectors have to be known in order that the indicator instrument can be calibrated for direct indication of wavelengths because of their known data. Because of the tolerances of the individual photodetectors, each indicator instrument of a respective measuring arrangement must be provided with an individually calibrated scale. Later correction calibrations are not practically possible. In the arithmetical determination of the calibration values on account of the spectral sensitivities of the photodetectors, influences by the elements for guiding the optical radiation to the photodetectors or by the evaluation circuits, more particularly due to the fluctuations determined by their individual tolerances, are not taken into account. In spite of a rather time-consuming and expensive calibration, a high measuring accuracy cannot be attained.

The invention has for its object to carry out the method of the kind mentioned in the opening paragraph in such a manner that a high measuring accuracy with a less complicated calibration and a simple recalibration are possible.

According to the invention, this object is achieved by the following features:

(a) in a calibration process, the flow of radiation (E) of a monochromatic calibration light source, variable in wavelength, is supplied to the optical input of the measuring arrangement, and the signals $(I1, I2)_{kal}$ of the photodetectors (1, 2) obtained at different wavelengths of the calibration light source distributed substantially uniformly over the relevant measuring range are stored in a digital memory unit (6) in association with the wavelength; and (b) in subsequent measuring processes, the signals (I1, I2) of the photodetectors acted upon by the flow of radiation of the light sources to be measured are compared through an interpolation circuit with the sets of signals $(I1, I2)_{kal}$ stored in the memory unit (6) for associated wavelengths with the wavelength at which this comparison provides a conformity being indicated by means of the indicator device (7) and/or being supplied by a data interface (8).

Details of the invention are provided from the following description, in which a few embodiments of the invention are disclosed with reference to the accompanying drawings, in which.

In the measuring method according to the invention, two or more photodetectors are used, which have different spectral overall sensitivity curves in the interesting wavelength range. According to the present application, the term "photodetectors" is to be understood to mean optical receivers of arbitrary kind, which convert incoming optical radiation into electrical signals. They generally consist of an opto-electronic converter (for example a photodiode) and an actuation device through which a light beam is supplied to the detecting region of the optoelectronic converter, as well as of an electrical control circuit. The overall spectral sensitivity of a photodetector, i.e. the wavelength-dependent variation of the intensity of the electrical output signal as a function of the intensity of optical radiation supplied to the actuation device, results mainly from the spectral sensitivity of the photoelectronic converter itself and the superimposed spectral properties of the actuation device, whose damping values are, for example, wavelength-dependent.

In the so-called calibration process, by means of a calibration radiation of variable wavelength, quantities derived from the overall spectral sensitivity values of the photodetectors (see below) are first stored in an electronic memory unit of the measuring arrangement, i.e., for example, in 1 nm steps within the overall measuring range.

In the measuring process, the monochromatic measuring radiation is incident through a transfer device on the active surfaces of the photodetectors. By means of a calculation unit, the values now derived from the electrical signals are compared with the calibration quantities stored in the memory unit. A conformity is then obtained only if the calibration quantity of the wavelength is used for comparison, which is predominant in the measuring radiation, so that the wavelength of the measuring radiation can be unambiguously defined and indicated. If the absolute overall spectral sensitivity of at least one photodetector is known (for example after a calibration measurement or on account of exact specifications), in addition to the indication of the wavelength the actual wavelength-corrected radiation power or irradiation intensity of the measuring radiation can also be indicated. The digital acquisition and evaluation of the calibration and measuring data and a digital indication have proved particularly favourable. The calibration process can be carried out and also be automatically controlled in the same manner for each individual measuring arrangement with the individual tolerances of all constructional groups of a respective measuring apparatus being acquisitioned. The indication device can be used both for indication of the wavelength and for indication of the optical power. In an analogue direct indication of the power, for each frequency special scales would have to be provided.

Figure 1:
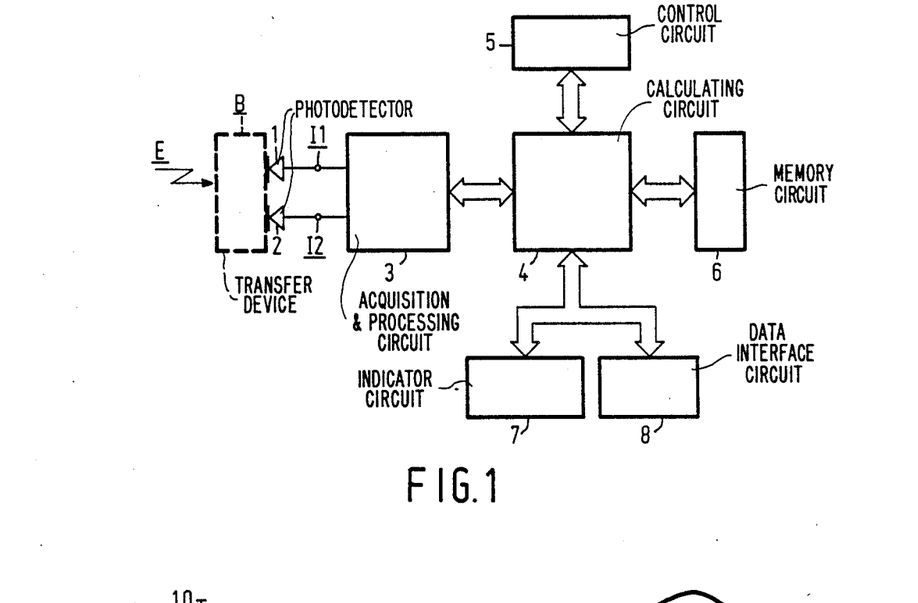
FIG. 1 shows the block circuit diagram of the measuring arrangement according to the invention.

FIG. 1 shows diagrammatically the block circuit diagram of the measuring apparatus according to the invention.

In the FIGURE, the following parts are designated by the following reference numerals:

1, 2 photodetectors,
3 unit for acquisitioning and processing the measurement values,
4 calculation unit,
5 control panel,
6 memory unit,
7 indicator unit,
8 data interface,
B transfer device,
$\overline{E}$ flow of radiation,
I1, I2 measuring signals.

Figure 2A:
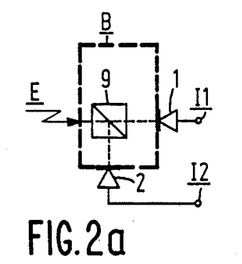
FIG. 2 shows different actuation devices.
Figure 2B:
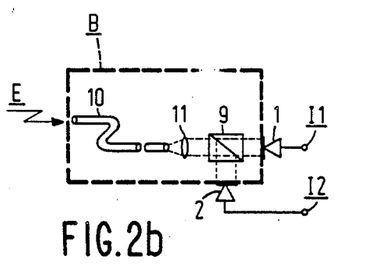
Figure 2C:
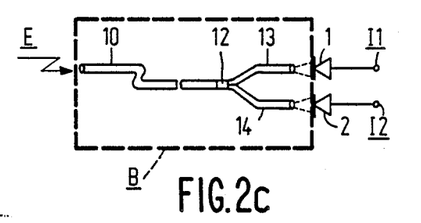

Normally, two photodetectors 1 and 2 are used, which are acted upon by means of an actuation device B simultaneously with the flow of radiation E to be measured. A few possibilities of the photodetectors being acted upon by the calibration or measurement radiation are shown in FIGS. 2a–2e. In FIG. 2a, a radiation divider is used. A very simple and practical supply of the flow of radiation to the detectors is shown in FIGS. 2b and 2c. In FIG. 2b, the light is guided through a light wave guide 10 and is imaged through the lens system 11 and the radiation divider 9. On both photodetectors 1 and 2 in FIG. 2c, the flow of radiation E is coupled into a light wave guide 10 and is then supplied directly to both photodetectors 1 and 2 through a light wave guide connection 12 (for example, a so-called splice) and two light wave guides 13 and 14. If the measuring arrangement is also to be used for measuring automatically wavelength-corrected radiation power, it has generally to be ensured that the overall measurement radiation attenuated or divided in a defined manner reaches the active surfaces of the photodetectors. For this purpose, different kinds of Ulbricht balls may preferably be used, which are described, for example, in German Patent Specification 300 2558 and German Patent Specification 300 2559.

Figure 2D:
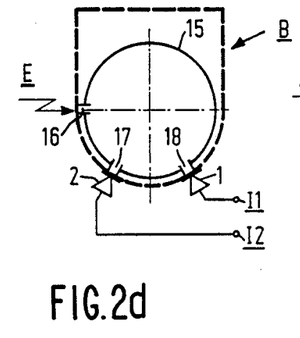
Figure 2E:
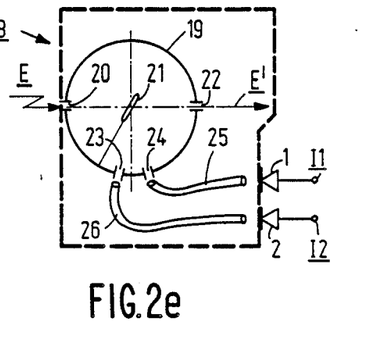

FIG. 2d shows that the photodetectors 1 and 2 can be directly secured at the openings 17 and 18, respectively, of an ulbricht ball 15. The flow of radiation E enters the hollow ball through the opening 16, is reflected several times in a diffuse manner at the inner coating, and finally acts in defined attenuated form upon the active surfaces of the two detectors 1 and 2. The measuring arrangement according to the invention can be very readily combined with the arrangement for measuring the radiation power or the radiation energy of lasers, which is described in German Patent Specification 300 2558 (FIG. 2e). The flow of radiation E enters the hollow ball 19 through the opening 20, is attenuated due to the Fresnel reflection at a dielectric plate 21, and finally leaves the cavity through the emanation opening 22. The flow of radiation E' is consequently available also during the measurement for further uses (continuous wavelength and power testing). The light wave guides 25 and 26 coupled to the openings 23 and 24 guide a defined part of the flow of radiation E to the photodetectors 1 and 2. This arrangement is particularly advantageous in low-loss monitoring and measuring of energetic monochromatic light sources. Further actuation devices may be composed of combinations of the means in FIGS. 2a–2e (for example FIG. 2e in combination with FIG. 2c).

Figure 3:
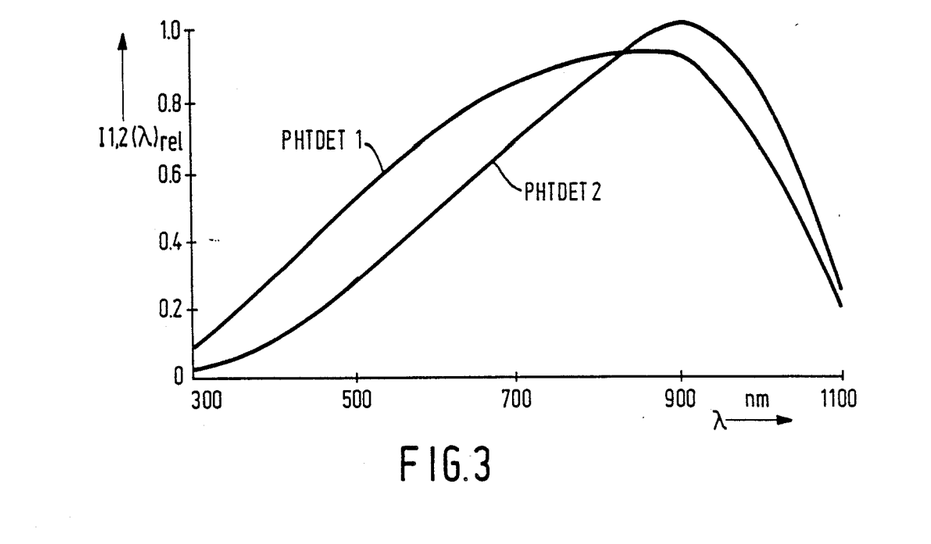
FIG. 3 shows the signal variation of two photodetectors of different spectral overall sensitivity (i.e. inclusive of the actuation device) as a function of the wavelength.

Within the scope of the calibration process, first; the quantities required in the later measurement for identification of wavelengths are determined. This is effected in the following manner: a monochromatic calibration light source variable in wavelength (for example a combination of a polychromatic light source with a monochromator) is connected through an actuation device B (shown, for example, in FIG. 2) to the photodetectors 1 and 2. While the wavelength of the calibration light source (the calibration light source now must not have an isoenergetic spectrum) is varied throughout the measuring range is given steps—for example equidistantly in steps of 1 nm—, the signals $I1_{kal}$ and $I2_{kal}$ of the two photodetectors 1 and 2 $I1_{kal}$ and $I2_{kal}$ are supplied to the unit 3 for acquisitioning and processing the measurement values. Simultaneously, the information about the actual wavelength is transmitted to the calculation unit 4 either manually through the control panel 5 or automatically through the data interface 8. FIG. 3 shows by way of example possible variations for the signal I1 and I2 for two detectors as a function of the wavelength with a constant calibration light power, standardized on the maximum value. In order that these signals become unambiguous independently of the calibration light power and in the measuring range, they are preferably stored not directly, but in the form of derived quantities $F(\lambda)$. By way of example, a few possible calculation specifications for $F(\lambda)$ are given below when two photodetectors are employed:

$$F1(\lambda) = \frac{I1(\lambda)}{I2(\lambda)}$$

$$F2(\lambda) = \frac{I1(\lambda) - I2(\lambda)}{I1(\lambda)}$$

$$F3(\lambda) = \frac{I1(\lambda) - I2(\lambda)}{I2(\lambda)}$$

$$F4(\lambda) = \frac{I2(\lambda) - I2(\lambda)}{I1(\lambda)}$$

Figure 4:
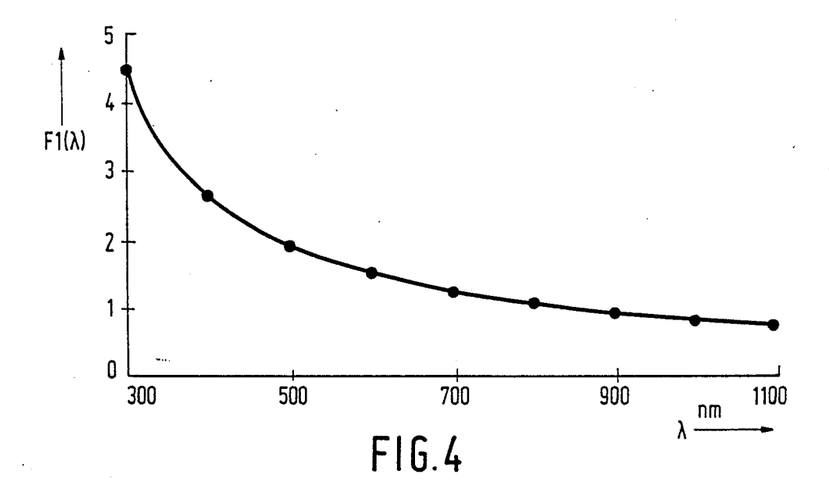
FIG. 4 and FIG. 5 show the standardization of the signal variation on one of the two signals.
Figure 5:
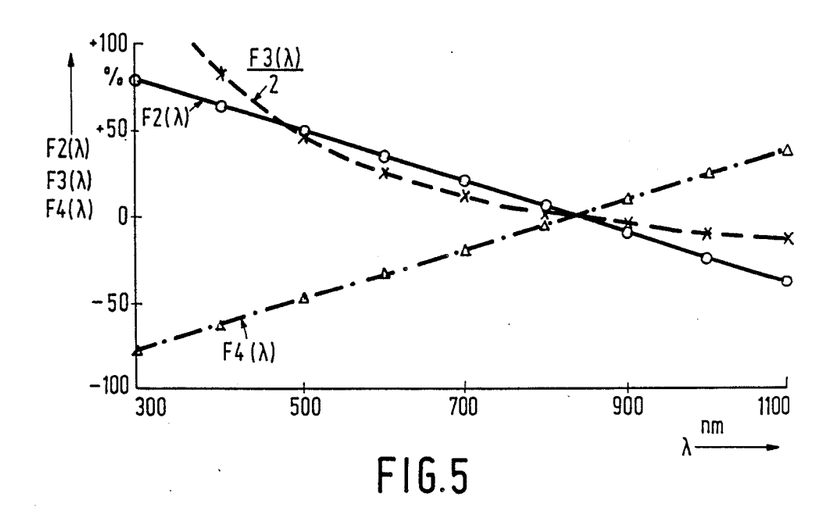
Figure 6:
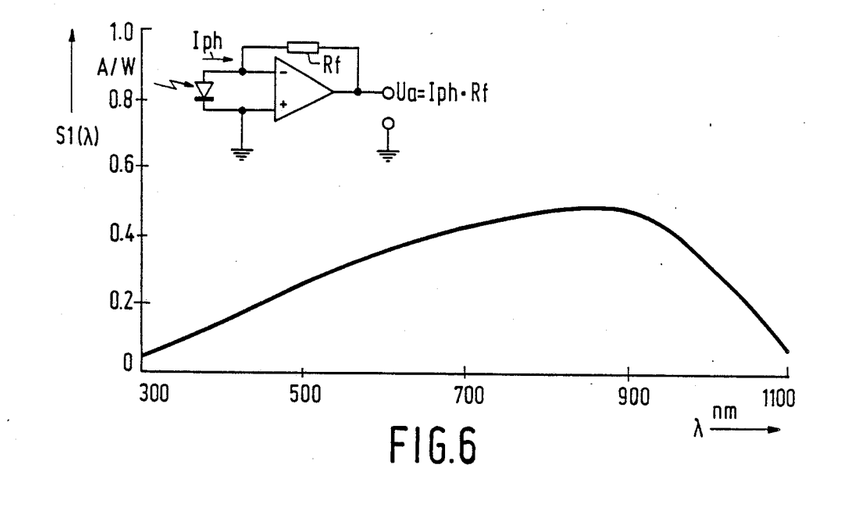
FIG. 6 shows the absolute spectral sensitivity of a photodetector.
Figure 7:
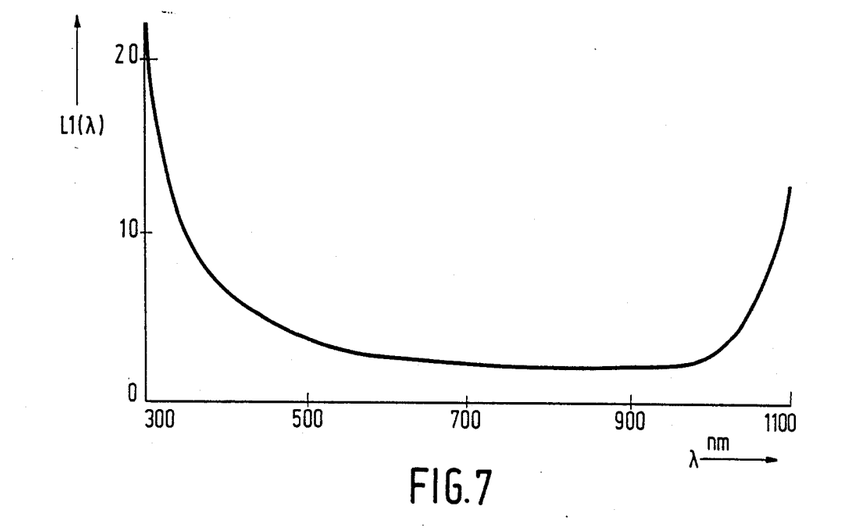
FIG. 7 shows the power correction function obtained therefrom.

These functions are represented for the signals I1 and I2 of FIG. 3 in FIG. 4 and FIG. 5. Due to the standardization on one of the two signals I1, pr I2, the indicated functions $F(\lambda)$ are independent of the light power of the calibration light source in the linearity range of the detectors. These function values $F(\lambda)$ can be stored in the memory unit 6 with the information about the adjusted wavelength of the calibration light source. The calibration light source should have a smaller spectral bandwidth than the stepwidth of the wavelength adjustment of the calibration light source. The wavelength calibration process, which is normally necessary only once, is then terminated. In case the measuring apparatus according to the invention should also be used for the automatic wavelength-corrected measurement of the radiation power, immediately during the wavelength calibration an isoenergetic monochromatic calibration light source can be utilized to render possible the absolute spectral calibration of at least one of the photodetectors. However, other methods may also be used, such as, for example, the calibration with a calibrated radiometer or the method described, for example, in German Patent Specification 290 4984. The calibration data may be supplied, as in the case in which the absolute spectral overall sensitivity of the photodetectors is known, through the control panel 5 or the data interface 8, and are stored, for example, in the form of a power correction function $L1(\lambda)$ in the memory unit. FIG. 6 shows a possible absolute overall sensitivity curve $S1(\lambda)$ of a detector with an actuation device, while FIG. 7 shows the power correction function $L1(\lambda)$ calculated therefrom by the calculation unit. As soon as the measuring arrangement according to the invention has stored the curves $F(\lambda)$ and $L1(\lambda)$, both the wavelength measurement and the automatically wavelength-corrected power measurement are possible.

The measurement proceeds as follows: The flow of radiation E to be measured is transmitted through the transfer device B, as in the calibration process described above, to the active surfaces of the photodetectors 1 and 2. The calculation unit 4 calculates from the signals $I1(\lambda)$ and $I2(\lambda)$ the associated wavelength function value $F(\lambda mess)$. After a comparison with the stored curve $F(\lambda)$, the wavelength of the flow of measurement radiation may be indicated by the indicator unit 7 and-/or be supplied through the data interface 8, as the case may be after an interpolation algorithm. The corresponding value can then be calculated with the wavelength found from the power correction function $L1(\lambda)$. With this value, a recalculation to the absolute power (or radiation intensity) is possible. This value may also be indicated by the indicator 7 or be supplied through the interface 8, for example, in Watts (or milliwatts) or—related to a value of, for example, 1 mW—in dBm.

In order to increase the measuring accuracy and/or to enlarge the measurement or unambiguity range, more than two photodetectors may also be used, however, which each have different spectral sensitivity variations. In this case, measurement signals I1 . . . I4 are supplied to a unit 3 for acquisitioning and processing measurement values. The solutions for actuating the photodetectors shown in FIG. 2 are also modified correspondingly when the number of photodetectors used is larger or smaller than two.

With the use of at least three photodetectors having each a different overall sensitivity, it can be tested whether the optical radiation to be measured is actually monochromatic, i.e. has at least a very narrow bandwidth of the wavelength spectrum.

The method according to the invention would in itself also lead to indication values when the optical radiation to be measured comprises light of greatly different wavelengths. Such measurement values would of course be wrong and erroneous. In order to avoid such errors, the method according to the invention can further be effected so that at least three photodetectors of different spectral sensitivity are used, which are acted upon in different combinations of two detectors each for producing a wavelength-dependent signal in the manner described above, wherein these signals are supplied to a comparison circuit which then tests whether these signals propose a corresponding wavelength, and wherein in the case of deviation of the wavelength propositions by more than one given limit value an indicator arrrangement is operated. Corresponding wavelength propositions are obtained by measurements by different combinations of two photodeteotors in general only if practically monochromatic light is measured. If on the contrary optical radiation should be measured, which comprises, for example, light of the wavelengths 850 nm and 1,350 nm, the indicator arrangement would supply a warning signal which gives an indication to the operator that no monochromatic radiation is present and a measurement would of course lead to senseless results. An additional advantage of such a multiple measurement is that warning signals are also supplied when the measuring apparatus is defective.

The mesuring arrangement described may be operated alternatively instead of with two photodetectors with a "real" photodetector and a simulated "fictive" photodetector if the overall spectral sensitivity of the "real" photodetector (inclusive of the actuation device) can be externally and repetitively influenced so that a different overall spectral sensitivity of the "fictive" second photodetector is intentionally simulated. Thus, again two different signals $I1(\lambda)$ and $I2(\lambda)$ are obtained. This influence can be exerted, for example, optically by means of a variation of the spectral transmission behaviour of the actuation device or electronically by means of a variation of the working point of the photodetector. A solution is of particular advantage in which the photodetectors consist of a single optoelectronic converter, which is acted upon in time succession on the one hand substantially directly by the optical radiation to be measured and then supplies the output signal I1 and which on the other hand is irradiated through a damping element having a spectrally different damping variation to supply the output signal I2. The optical beam to be measured can be first guided by a rotating disk, which on the one hand has a segment which transmits the optical beam to a photodiode without influencing it and on the other hand has a filter element which in dependence upon the wavelength has different damping values. In the same manner as in the embodiment described comprising more than two photodetectors, more than two segments may also be provided, which each have different spectral damping characteristics. Efficaciously, the rotating disk is driven by a synchronous motor whose speed is in synchronism with the rhythm of the change-over of the time range of the evaluation circuit for the output signals of the photodiode. The use of only one photodiode and the formation of spectral differences by preceding transfer elements have the advantage that temperature errors which can occur due to different temperatures of two photodiodes are excluded.

If the flow of radiation E is not continuous in time, but is, for example, pulsatory, the calculation unit 4 can also calculate other parameters of the flow or radiation, such as, for example, the pulse energy or pulse duration and the like.

Figure 8:
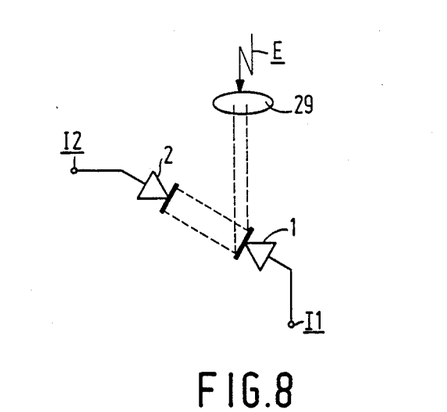
FIG. 8 shows an actuation possibility by utilizing the reflection of a photodiode.

No special arrangement for beam splitting is required for actuation of the photodiodes 1 and 2 as shown in FIG. 8. The flow of radiation E is transmitted through the lens 29 at an angle deviating from the normal and the optical axis, respectively, to the detector surface of the photodiode 1. A part of the flow of radiation E reaches the photodiode 1 so that the electrical output signal I1 is produced therein. Because of the reflection by the detector surface of the photodiode 1 in the direction of the optical axis of the photodiode 2 the remaining part is transmitted to the latter photodiode so that the electrical output signal is produced therein.

The angle between the flow of radiation originating from the lens 29 and the optical axis of the photodiode 1 has to be at least so small that no total reflection can occur.

Since the characteristics of photodetectors are generally temperature-dependent, it is recommended to adjust the temperature of the photodetectors to a constant value. This can be effected particularly advantageously in that the photodetectors 1 and 2 are heated to a constant temperature which is higher than the maximum ambient temperature to be expected, which can occur in a simple manner in that heating currents are supplied to the photodetectors outside the actual measuring time. The unit 3 for acquisitioning and processing the measurement values can be provided with a temperature acquisitioning circuit which in cooperation with the calculation unit 4 produces control signals for keeping the temperature constant. The temperature increased with this kind of control at the time brings about advantageous an increase of the spectral sensitivity of the photodeteotors.

Figure 9:
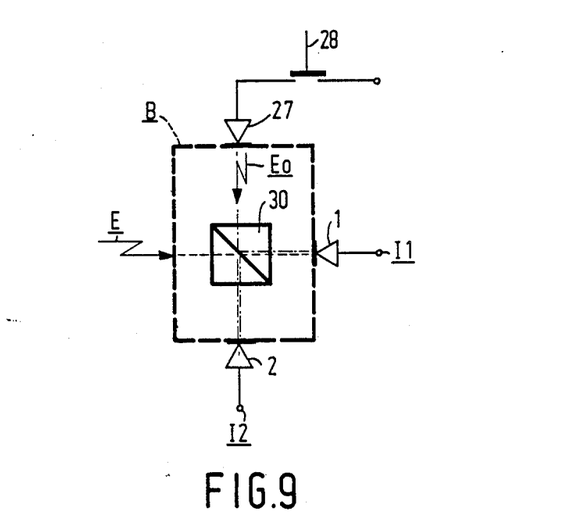
FIG. 9 shows an arrangement for testing the operational accuracy of the measuring arrangement according to the invention.

In order to ascertain whether the temperature constancy is given or in order to occasionally test the accuracy of operation, it is advantageous to provide the measuring arrangement according to the invention with an optical testing radiator in the form of a light-emitting diode 27 shown in FIG. 9, which can be switched on by means of the testing key 28. Its radiation Eo can be transmitted by a second input of the optical branching element 30 to the photodiodes 1 and 2, while the flow of radiation E to be measured can be distributed through a first input of the branching element 30 over the photodiodes 1 and 2. When the testing key 28 is operated, given values for wavelength and optical power have to be indicated by the indicator device of a measuring arrangement ready for use. A deviation from these nominal values generally means that the temperature constancy is not yet reached so that a recalibration is required.

We claim:

1. In a method of determining radiation wavelengths of substantially monochromatic optical radiation comprising the steps of transmitting monochromatic optical radiation to at least two photodetectors having different spectral sensitivity variations, supplying electrical output signals from said photodetectors to an electronic circuit for acquisitioning and processing measurement values, and supplying output signals depending on said optical radiation from said electronic circuit to an indicating circuit, said indicating circuit being calibrated to directly indicate radiation wavelengths, wherein the improvement comprises for a calibration technique the steps of obtaining said optical radiation from a calibrated monochromatic light source having a variable wavelength, obtaining said electrical output signals of said photodetectors at different wavelengths of said light source, distributing said different wavelengths substantially uniformly over a relevant measuring range, and storing said relevant measuring range in a digital memory circuit in association with said different wavelengths;

wherein the improvement comprises for a subsequent measuring technique the step of comparing said electrical output signals of said photodetectors with sets of signals stored in said digital memory circuit for associated wavelengths, and providing an indication of conformity between wavelengths of said electrical output signals of said photodetectors and said associated wavelengths by said indicating circuit, and wherein in said calibration technique said light source includes an isoenergetic monochromatic light source of known power, said electrical output signals of said photodetectors obtained at different wavelengths, said wavelength being stored in said memory circuit in association with both wavelength and a respective radiation power where power correction factors are $L(g)$; and wherein for measuring said radiation power, absolute values and wavelengths of respective electrical output signals of said photodetector are compared to combinations of values stored in said memory circuit, conformity between stored values and measured values being indicated by said indicating circuit.

2. A method according to claim 1, wherein a data interface circuit supplies signals of said associated wavelengths to said indicating circuit.

3. A method according to claim 1 or claim 2, wherein said indicating circuit indicates digital signals.

4. A method according to claim 1 or claim 2, wherein said electronic circuit includes a divider circuit receiving said electrical output signals from said photodetectors for supplying a signal to said memory circuit, said signal consisting of either a quotient of said electrical output signals of said photodetectors or a difference of said electrical output signals of said photodetectors divided by another of said electrical output signals of said photodetectors.

5. A method according to claim 1 or claim 2, wherein at least three photodetectors of different spectral sensitivity are used, wherein different combinations of two said photodetectors provide wavelength-dependent signals, said wavelength-dependent signals being supplied to a comparison circuit for testing for corresponding wavelengths, and wherein said indicator circuit is operated for deviations of said wavelengths by more than one given limit value.

6. A method according to claim 1 or claim 2, wherein said electrical output signals are obtained in time sequence from only one photodetector, said one photodetector having an overall spectral sensitivity being optically or electrically varied during measurement of at least one of said signals.

7. A method according to claim 1 or claim 2, wherein said photodetectors consist of a single opto-electronic converter, said single opto-electronic being operated in time sequence directly by optical radiation to be measured to produce one of said electrical output signals, and said opto-electronic converter being irradiated through damping means for providing spectrally different damping variations to produce another of said electrical output signals.

8. An apparatus for determining radiation wavelengths of substantially monochromatic optical radiation comprising
a light source of monochromatic radiation to be measured,
first means for transferring said radiation from said light source,
at least two photodetectors receiving said radiation from said first means, said photodetectors being of different overall spectral sensitivity, wherein said photodetectors have a constant temperature value,
second means receiving electrical output signals from said photodetectors for acquisitioning and processing said electrical output signals,
a calculating circuit receiving signals from said second means, a control circuit for controlling said calculating circuit, and a memory circuit for storing information from said signals, and
an indicator circuit connected to said calculating circuit for indicating information.

9. An apparatus according to claim 8, wherein said photodetectors consist of a single opto-electronic converter, said single opto-electronic converter having time multiplex circuitry for alternately controlling spectral sensitivity variations differently.

10. An apparatus according to claim 9, wherein a filter circuit having damping values depending on optical wavelengths is disposed before said single opto-electronic converter in periodical succession.

11. An apparatus according to claim 8, wherein said first means includes a radiation splitter for distributing said radiation to said photodetector.

12. An apparatus according to claim 11, wherein said first means includes a Ulbricht ball means for transferring said radiation to said photodetectors, said Ulbricht ball means having an entrance opening and at least two exposure openings for directing radiation to said photodetectors outside an axis of said radiation.

13. An apparatus according to claim 12, wherein said Ulbricht ball means has an exit opening for said radiation on said axis, and wherein a flat glass plate inclined at an acute angle to said axis is disposed inside said Ulbricht ball means.

14. An apparatus according to claim 11 or claim 12, wherein said first means includes at least two light wave guides and a light wave guide connection member.

15. An apparatus according to claim 8 or claim 11, wherein one of said photodetectors is acted upon by radiation at small angle to an optical axis of said light source, and another photodetector is disposed to receive reflected radiation components from said one photodetector.

16. An apparatus according to claim 8, wherein said photodetectors are cooled to said constant temperature value.

17. An apparatus according to claim 8, wherein said photodetectors are heated to said constant temperature value, said constant temperature value being higher than a maximum ambient temperature.

18. An apparatus according to claim 16, wherein said photodetectors are provided with heating currents outside of actual measuring time.

19. An apparatus according to one of claim 8, claim 16, claim 10, or claim 11, wherein said first means includes a temperature acquisitioning circuit, said temperature acquisitioning circuit in combination with said calculating circuit providing control signals for maintaining said constant temperature value.

20. An apparatus according to claim 8, wherein an optical diode is provided for supplying optical radiation to said first means.

* * * * *